United States Patent [19]

Takamatsu

[11] Patent Number: 4,877,309

[45] Date of Patent: Oct. 31, 1989

[54] COLOR LIQUID CRYSTAL DISPLAY UNIT

[75] Inventor: Toshiaki Takamatsu, Yamatokoriyama, Japan

[73] Assignee: Sharp Kabushiki Kaisha, Osaka, Japan

[21] Appl. No.: 130,110

[22] Filed: Dec. 8, 1987

[30] Foreign Application Priority Data

| Dec. 8, 1986 | [JP] | Japan | 61-292107 |
| Feb. 10, 1987 | [JP] | Japan | 62-28560 |
| Apr. 22, 1987 | [JP] | Japan | 62-99322 |
| Jul. 13, 1987 | [JP] | Japan | 62-174439 |
| Aug. 19, 1987 | [JP] | Japan | 62-205383 |

[51] Int. Cl.$^4$ ............................................. G02F 1/13
[52] U.S. Cl. ..................................... 350/337; 350/335; 350/339 F
[58] Field of Search ..................... 350/339 F, 335, 337

[56] References Cited

U.S. PATENT DOCUMENTS 3,569,614  3/1971  Hanlon ............................ 350/339 F
4,241,339 12/1980  Ushiyama ........................... 350/335
4,581,608  4/1986  Aftergut et al. ..................... 350/332
4,610,507  9/1986  Kamamori et al. ............. 350/339 F

FOREIGN PATENT DOCUMENTS 0125328  6/1987  Japan .............................. 350/339 F Primary Examiner—Stanley D. Miller
Assistant Examiner—Huy Kim Mai
Attorney, Agent, or Firm—Birch, Stewart, Kolasch & Birch

[57] ABSTRACT

A color liquid crystal display device is composed of first and second liquid crystal display cells aligned over each other, in which each cell includes a pair of color polarizers having respective polarization axes which are oriented at right angles to each other. The color polarizers of each cell contain at least one color which is the complement of the color contained in the other color polarizer. In this way, display contrast and brightness can be enhanced by allowing a higher ratio of picture elements to be utilized for monochromatic displays.

6 Claims, 14 Drawing Sheets

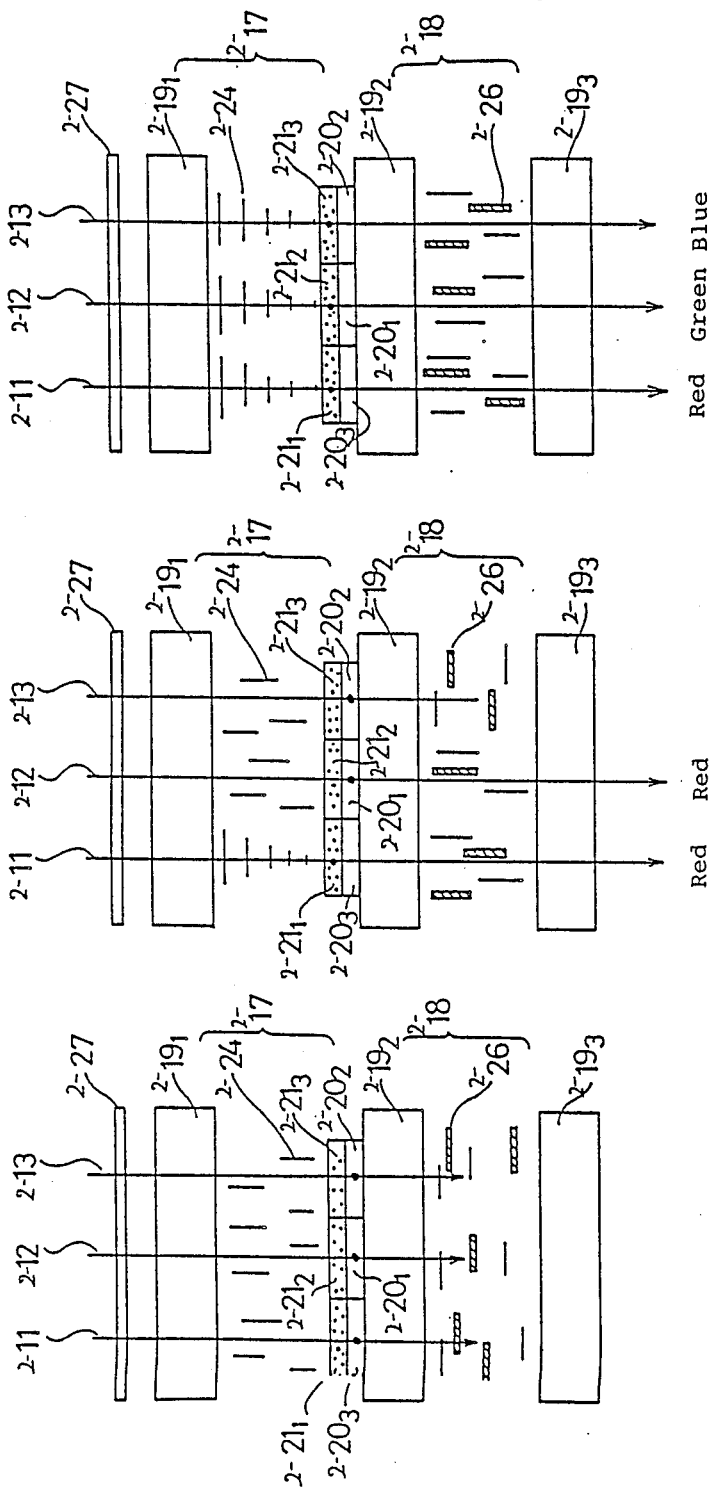

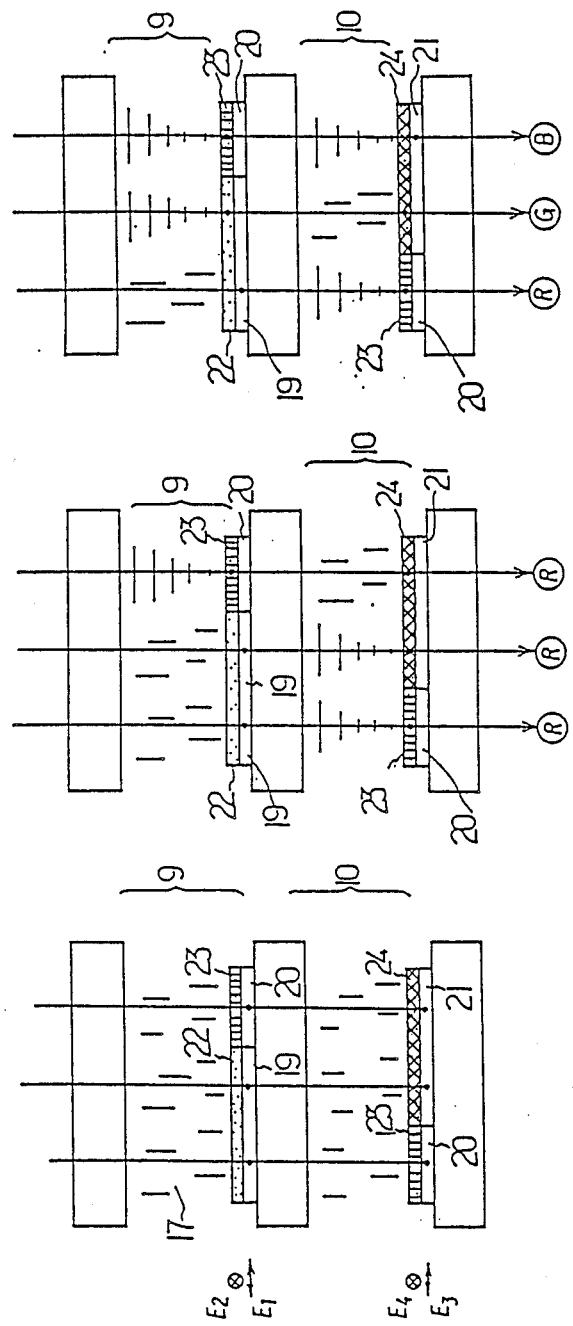

COLOR LIQUID CRYSTAL DISPLAY UNIT

BACKGROUND OF THE INVENTION

Various types of color display units using liquid crystals have been presented. Among them are color liquid crystal display units which form a color filter layer using the inside surface of a liquid crystal cell. The characteristics of red, green and blue micropatterns are such that the cell structure is relatively simple and full color display is possible.

This invention relates to improvements of color liquid crystal display units which have red, green and blue micropatterns and enable full color display.

A former color liquid display unit Da is, as shown in FIG. 21, composed of a relief pattern comprising gelatin, glue or casein combining color filters 6-9a, 6-10a, and 6-11a dyed to red, green and blue, a twisted nematic liquid crystal layer 6-36a, and two photolithography type neutral polarizers 6-37a and 6-37b.

Another former color liquid crystal display unit Dc is, as shown in FIG. 22, composed by combining color polarizers 6-9c, 6-10c, and 6-11c in which dichromatic dyes are lined up in one direction, with a neutral polarizer 6-37c (see patent publication gazette No. SHO 58-7177 and 58-17420).

In the color liquid crystal display unit Da, usually two neutral polarizers 6-37a and 6-37b are positioned so that their directions of polarization (arrow Fa and Fb) are parallel, black is displayed when no voltage is applied to the transparent electrodes 6-24a, 6-18a, 6-19a, and 6-20a, and when voltage is applied, liquid crystal molecules rise in the direction of the electric field to display the colors of the color filters themselves. Therefore, by selecting the voltage to be applied to each picture element of red, green and blue independently and freely, the desired colors can be displayed on the black base.

However, there was a problem in this type of color liquid crystal display unit Da in that only one-third of the picture elements can contribute to the display in case of single-color display of red, green or blue and the remainder of the display is dark.

In order to solve this problem, a light source may be placed on the back side of the display to achieve a higher contrast and brighter display. This is undesirable, however, since the primary advantages of liquid crystal display units are low power consumption and thinness. These advantages are reduced if a light source is to be arranged on the back side.

The problem with color liquid crystal display unit Dc is that only one-third of the picture elements can contribute to the display in the case of single-color display of red, green or blue, as in the above color liquid crystal display unit Da. In addition, a total display of black is impossible. When there is no electric field, the direction of polarization of the linear polarization agrees with the absorption axis direction of the color polarizers 6-9c, 6-10c, and 6-11c and they are seen as red, green and blue colors. When an electric field is applied, the linear polarization is not absorbed by the color polarizers 6-9c, 6-10c, or 6-11c, and they are seen as colorless. In the color liquid crystal unit Dc, colors are displayed in white or no color and therefore the entire display is brighter but, on the other hand, the display contrast is inferior.

SUMMARY OF THE INVENTION

This invention was made in light of the above situation to provide a color liquid crystal display unit with expanded display area, bright display characteristics, high display contrast, low power consumption and thinness.

This invention relates to a color liquid crystal display unit which can selectively display any one of the color polarizers laid upon one another or which can display black.

Referring to the detailed composition, the invention relates to a color liquid display unit in which at least two color polarizers with different absorption characteristics and absorption axes crossing at right angles to each other are arranged so as to lie upon each other at corresponding positions on each substrate interposing the first and second liquid crystal layers respectively arranged so as to lie upon each other to rotate the direction of polarization of the incidence polarized light selectively by 90° in response to the application of voltage; a neutral polarizer with a direction of polarization parallel with, or crossing the upper absorption axis direction on the light incidence or outgoing side; the directions of the absorption axes of the above color polarizers being arranged so as to correspond to each other on the upper and lower layers in almost the same direction.

This invention further relates to a color liquid display unit comprising a first liquid crystal layer using twisted nematic mode to selectively set up conditions where the direction of polarization of the incident polarized light is rotated by 90° and where the incident polarized light is allowed to pass through as it is when voltage is applied or not applied. A second liquid crystal layer making use of guest host material to selectively set up conditions so that the incident polarized light is absorbed by dichromatic dye added to the liquid crystal and where the incident polarized light is allowed to pass through as it is; circuit boards to interpose the first and second liquid crystal layers respectively; two color polarizers laid upon each other on the circuit board on the side interposing the first liquid crystal layer so that the absorption characteristics are different from each other and the directions of the absorption axes cross at right angles; and a neutral polarizer, the direction of polarization of which is parallel to the direction of the absorption axis of either one of the color polarizers.

According to this invention, 2/3 or 3/3 of the picture elements can contribute to the display in case of single color display and, in addition, black display is possible. As a result, the display is bright and color display with excellent display contrast can be realized.

As described in the second embodiment two, by using the guest host mode, a color liquid crystal display with less display contrast reduction can be realized even when viewed at a wide angle range.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 6 through 8 are explanatory drawings of the operation of the embodiment of FIG. 1, FIG. 6 is an operational explanatory drawing for black display, FIG. 7 shows red single color display and FIG. 8 is an explanatory drawing of the operation for white display.

FIG. 10 shows black display,

FIG. 11 red display, and

FIG. 12 white display.

FIG. 5 is a block diagram of a former color liquid crystal display cell using a color filter.

FIGS. 14 through 16 are explanatory drawings of the operation of the same embodiment, FIG. 14 shows the display condition during black display, FIG. 15 shows red single color display, and FIG. 16 shows white display condition.

The numerals 4-17 show a liquid crystal molecule, 4-11, 4-16 1 and 4-16 2 are glass substrate, 4-22, 4-23, and 4-24 are cyan, magenta, and yellow color polarizers, 4-19, 4-20, and 4-20 are red, green, and blue color polarizers, and R, G and B show red, green and blue color light.

Figure 17:
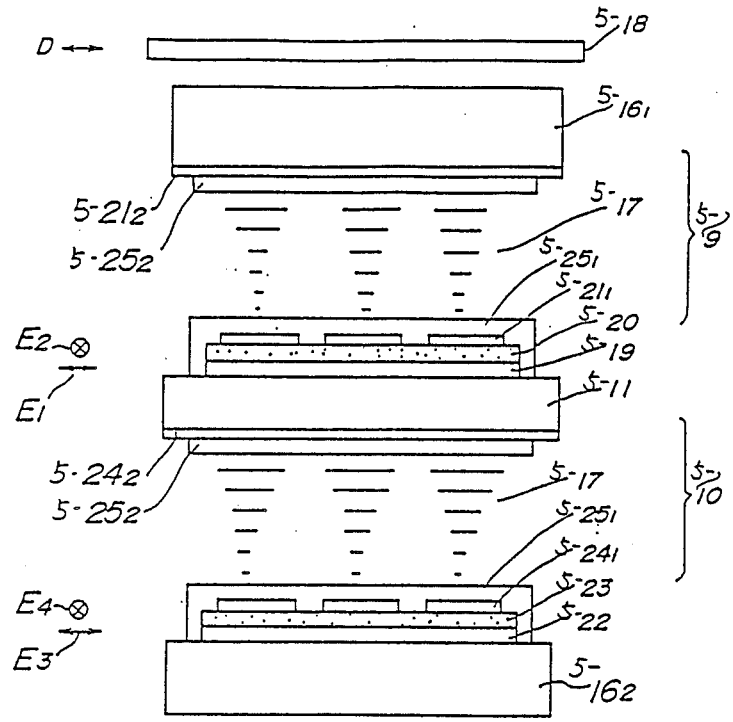
Figures 18, 19:
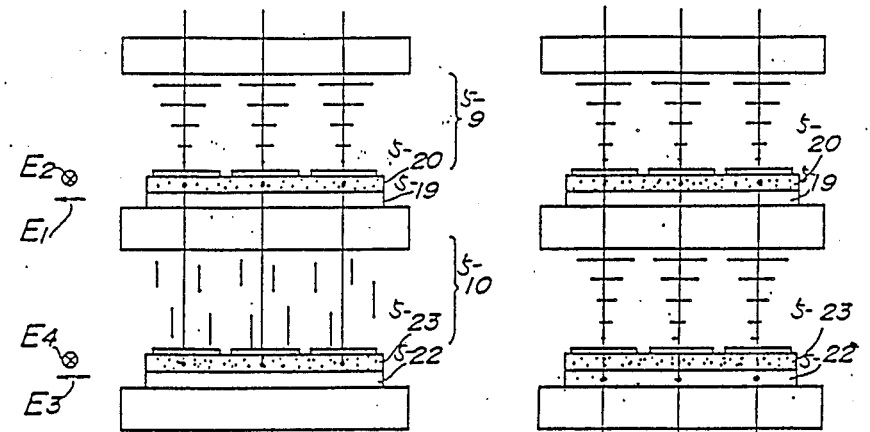
Figure 20:
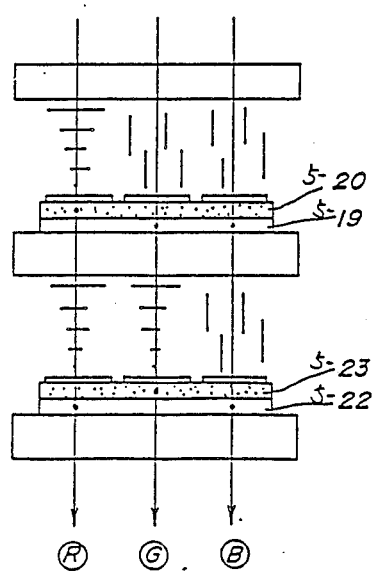

FIG. 17 is a sectional view showing the cell structure of the embodiment according to this invention, FIGS. 18 through 20 are explanatory drawings of the operation according to this invention.

FIG. 18 shows black display,

FIG. 19 shows red single color display, and

FIG. 20 shows white display.

Figure 21:
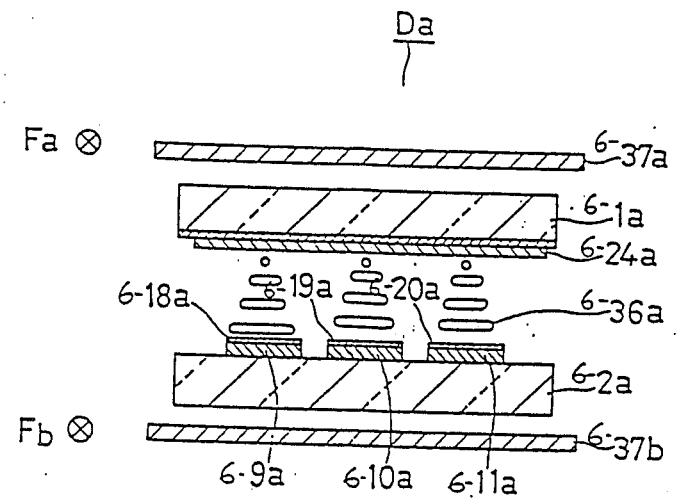
Figure 22:
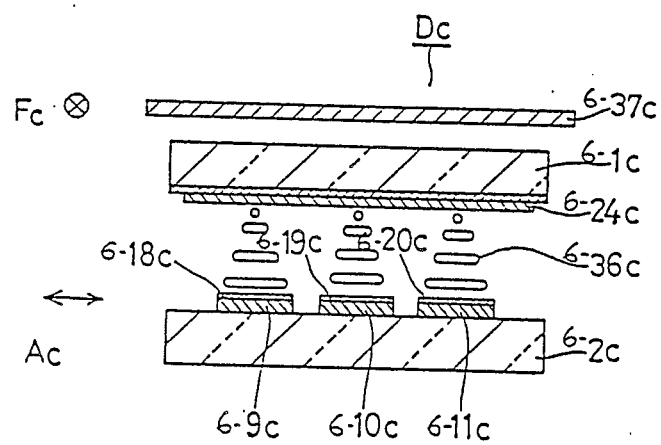

FIG. 21 shows a cell structure of a former color liquid crystal display unit using a color filter, and FIG. 22 show a cell structure of a former color liquid crystal display unit using a color polarizer.

Numerals 5-7 shows liquid crystal, 5-11, 5-16 1, and 5-16 2 glass substrate, 5-17 liquid crystal, 5-18 neutral polarizer, 5-19 color polarizer (cyanogen), 5-20 color polarizer (red), 5-22 color polarizer (green), 5-21 2 electrode, 5-24 1 electrode, and R, G and B show the red, green and blue color light.

DESCRIPTION OF THE PREFERRED EMBODIMENT

[Embodiment 1]

This invention will be described below in detail according to the embodiment as shown in FIGS. 1 to 4 but is not limited thereto.

Figure 1:
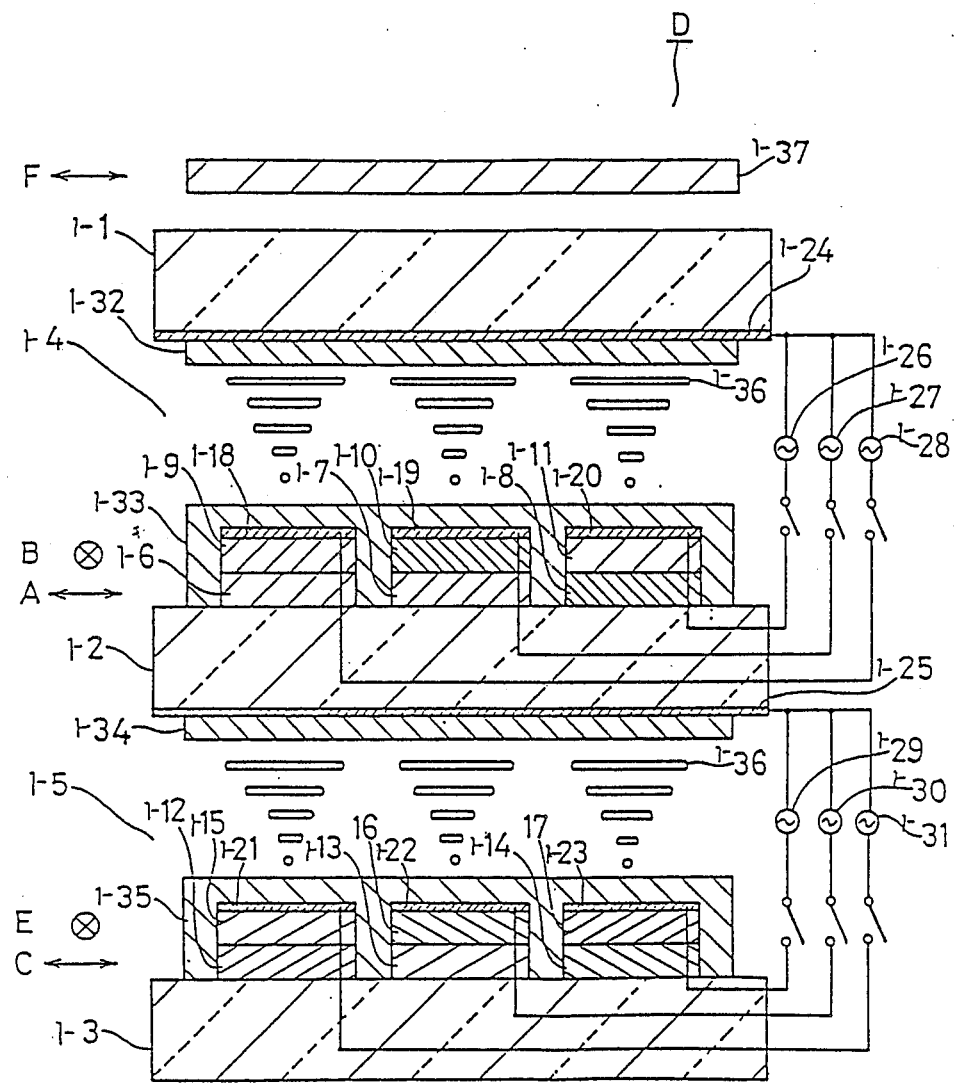
FIG. 1 is an explanatory drawing of the configuration showing an embodiment of this invention.

FIG. 1 shows the composition of the color liquid crystal display unit D. Two cells 1-4 and 1-5 are formed by glass substrates 1-1 and 1-2, and 1-2 and 1-3 arranged in parallel. Blue, red and green color polarizers 1-6, 1-7, and 1-8 are laid upon one another respectively on the glass substrate 1-2. The direction of the absorption axes of the color polarizers 1-6, 1-7, and 1-8 is shown by arrow A. The color polarizers 1-6, 1-7, and 1-8 are formed by applying single-shaft drawn polyvinyl alcohol film (not illustrated) onto the glass substrate 1-2 in the direction of arrow A and dying using respective blue, red and green dichromatic dyes to specified patterns. The second layer color polarizers 1-9, 1-10, and 1-11 which are red, green and blue respectively are laid upon the color polarizers 1-6, 1-7, and 1-8. The absorption axis direction of the color polarizers 1-9, 1-10, and 1-11 is in the direction of arrow B, crossing the direction of the absorption axis of the color polarizers 1-6, 1-7, and 1-8 at right angles. The color polarizers 1-9, 1-10, and 1-11 are formed by applying one-shaft drawn polyvinyl alcohol film (not illustrated) onto the color polarizers 1-6, 1-7, and 1-8 in the direction of arrow B and dying to specified patterns using red, green and blue dichromatic dyes respectively.

At the positions on the glass substrate 1-3 corresponding to the color polarizers 1-6, 1-7, and 1-8, color polarizers 1-12, 1-13, and 1-14 of yellow, cyan, and magenta which are complementary colors respectively of the blue, red and green of the color polarizers 1-6, 1-7, and 1-8 are formed. Arrow C shows the direction of absorption of the color polarizers 1-12, 1-13, and 1-14 which is the same as that of the color polarizers 1-6, 1-7, and 1-8. The color polarizers 1-12, 1-13, and 1-14 are formed by attaching one-shaft drawn polyvinyl film (not illustrated) to the glass substrate 1-3 in the direction of arrow C and dying the specified pattern with yellow, cyan and magenta respectively.

On the color polarizers 1-12, 1-13, and 1-14, second layer color polarizers 1-15, 1-16, and 1-17 of cyan, magenta, and yellow, which are complementary colors of red, green and blue which are colors of the color polarizers 1-9, 1-10, and 1-11 respectively, are formed. The direction of the absorption axis of the color polarizers 1-15, 1-16, and 1-17 is indicated by arrow E crossing the direction of the absorption axis of the color polarizers 1-12, 1-13, and 1-14 at right angles. The color polarizers 1-15, 1-16, and 1-17 are formed by attaching single-shaft drawn polyvinyl alcohol film (not illustrated) onto the color polarizers 1-12, 1-13, and 1-14 in the direction of arrow E and dying them with specified patterns using cyan, magenta, and yellow dyes. The colors of the first layer color polarizers 1-6, 1-7, and 1-8 and the colors of the second layer color polarizers 1-9, 1-10, and 1-11 on the glass substrate 1-2 are deviated by one pitch respectively. In the same way, the colors of the first layer color polarizers 1-12, 1-13, and 1-14 and those of the second layer color polarizers 1-15, 1-16, and 1-17 on the glass substrate 1-3 are deviated by one pitch respectively.

1-18, 1-19, 1-20, and 1-21, 1-22, and 1-23 are transparent electrodes. The transparent electrodes 1-18, 1-19, 1-20, and 1-21, 1-22, and 1-23 are formed by applying transparent conductive film by the low temperature spattering method and then etching with the specified patterns.

1-24 and 1-25 are transparent electrodes corresponding to transparent electrodes 1-18, 1-19, and 1-20 and 1-21, 1-22, and 1-23 respectively.

1-26, 1-27, 1-28, 1-29, 1-30, and 1-31 to are power sources for supplying voltage between the transparent electrodes 1-24 and 1-18, 1-19, 1-20, and 1-25 and 1-21, 1-22, and 1-23 respectively.

1-32, 1-33, 1-34, and 1-35 are liquid crystal molecule orientation films.

Twisted nematic liquid crystal 1-36 has been injected into the cells 1-4 and 1-5 and sealed with seal (not illustrated).

1-37 shows a neutral polarizer arranged on the incident light side of the cell 1-4. The direction of polarization of the neutral polarizer 1-37 is in the direction of arrow F. That is, the direction of polarization of the neutral polarizer 1-37 crosses the direction of the absorption axis of the color polarizers 1-9, 1-10, 1-11, 1-15, 1-16, and 1-17 at right angles and parallel to the direction of the absorption axis of the color polarizers 1-6, 1-7, 1-8, 1-12, 1-13, and 1-14.

Figure 2:
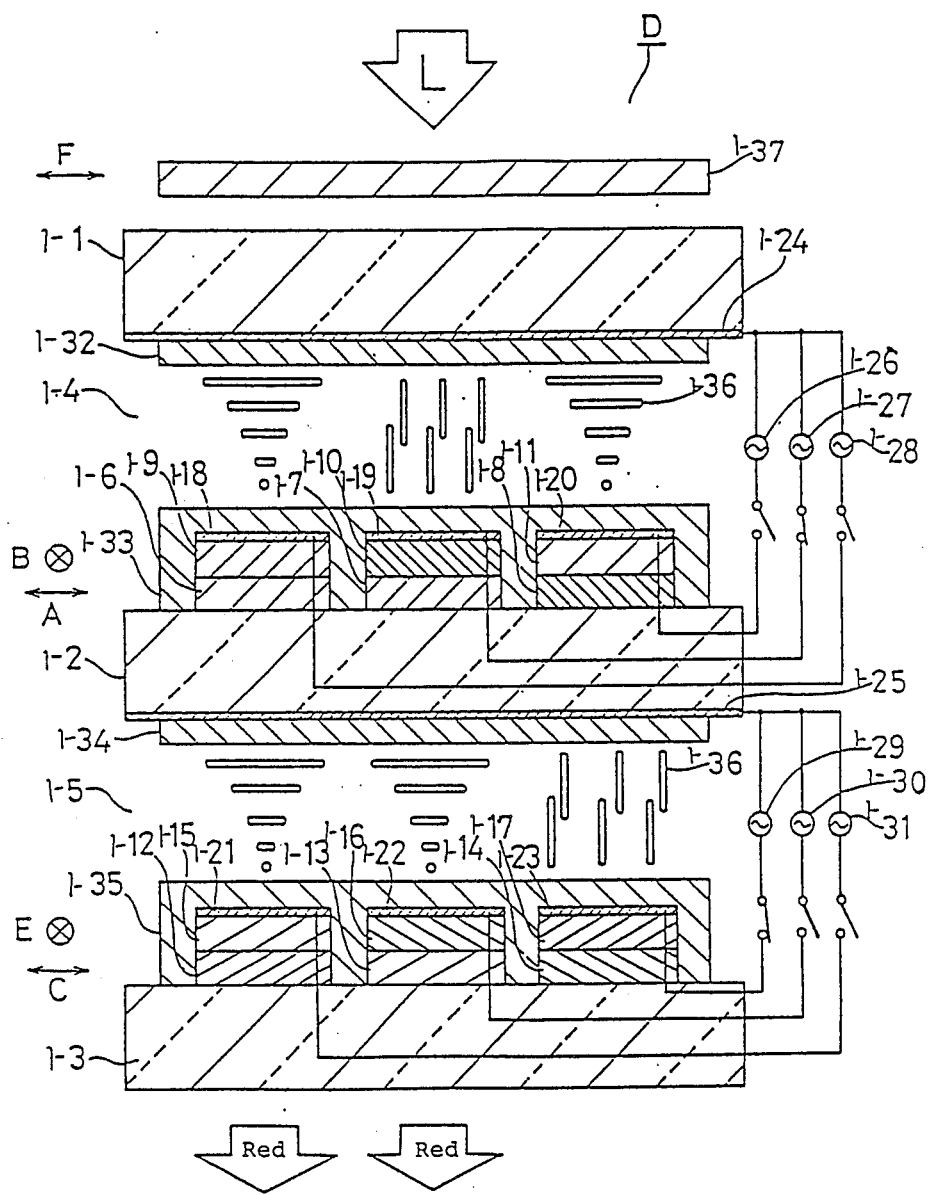
FIGS. 2 through 4 are explanatory drawings of the configuration showing the operation of the embodiment.

The color liquid crystal display unit D is composed as described above. Its operation is described below. FIG. 2 shows an example of a single color display of red. Voltage is applied between the transparent electrodes 1-19, 1-24, and 1-23 and 1-25. The incident light (arrow L) is polarized in the direction of arrow F by the neutral polarizer 1-37, transmitted through the glass substrate 1-1, transparent electrode 1-24, and liquid crystal molecule orientation film 1-32 and enters the layer of the liquid crystal 1-36 of the cell 1-4. The light is twisted by 90° only between the transparent electrodes 1-18 and 1-24, and 1-20 and 1-24 and reaches the transparent electrodes 1-18 and 1-20 respectively. The light is not twisted between the transparent electrodes 1-19 and 1-24 and reaches straight to the transparent electrode 1-19.

The light which reaches the transparent electrode 1-18 enters the color polarizer 1-9 and is colored red. In the lower layer color polarizer 1-6, the direction of polarization of the light which was changed red by the color polarizer 1-9 crosses the direction of the absorption axis of the color polarizer 1-6 at right angles and therefore transmits straight free from any influence. The red light after passing through the color polarizer 1-6 is transmitted through the glass substrate 1-2, transparent electrode 1-25, and liquid crystal molecule orientation film 1-34, advances to the cell 1-5, is bent by 90° and reaches the transparent electrode 1-21. The light after reaching the transparent electrode 1-21 advances to the color polarizer 1-15. At this time, since the direction of polarization of the light crosses the direction of the absorption axis of the color polarizer 1-15 at right angles, the light is transmitted through the color polarizer 1-15 as red without being absorbed by the cyan color and advances to the color polarizer 1-12. The direction of polarization of the light advancing to the color polarizer 1-12 is parallel to the direction of the absorption axis of the color polarizer 1-12. However, since the color polarizer 1-12 is yellow, the red light is transmitted as red and is seen as red below the glass substrate 1-3.

After having reached the transparent electrode 1-20 the enters the color polarizer 1-11, is colored blue, passes through the color polarizer 1-8 straight and advances to the cell 1-5. Then the light reaches the transparent electrode 1-23 without being twisted since a voltage is applied between the transparent electrodes 1-23 and 1-25 and advances to the color polarizer 1-17. In the color polarizer 1-17, since the color polarizer 1-17 is yellow which is a complementary color of blue, the blue light is absorbed and cut off, and therefore seen as black below the glass substrate 1-3.

After having reached the transparent electrode 1-19, the light advances to the color polarizers 1-10 and 1-7, is colored red by the color polarizer 1-7 with the same direction of polarization and direction of absorption axis, and advances to the cell 1-5. The red light from the color polarizer 1-7 is twisted by 90° by the cell 1-5 and transmits through the magenta color polarization 1-16 straight. Then, the light transmits the color polarizer 1-13 of cyan, the complementary color of red, straight without being absorbed since the direction of polarization crosses at a right angle, and is seen as red below the glass substrate 1-13.

As described above, in the color liquid crystal display unit D, the red display extends over 2/3 of the display area. The display area is large, the picture is bright and contrast is high. Therefore, no light source is needed and low power consumption and thinness are still ensured.

Figure 3:
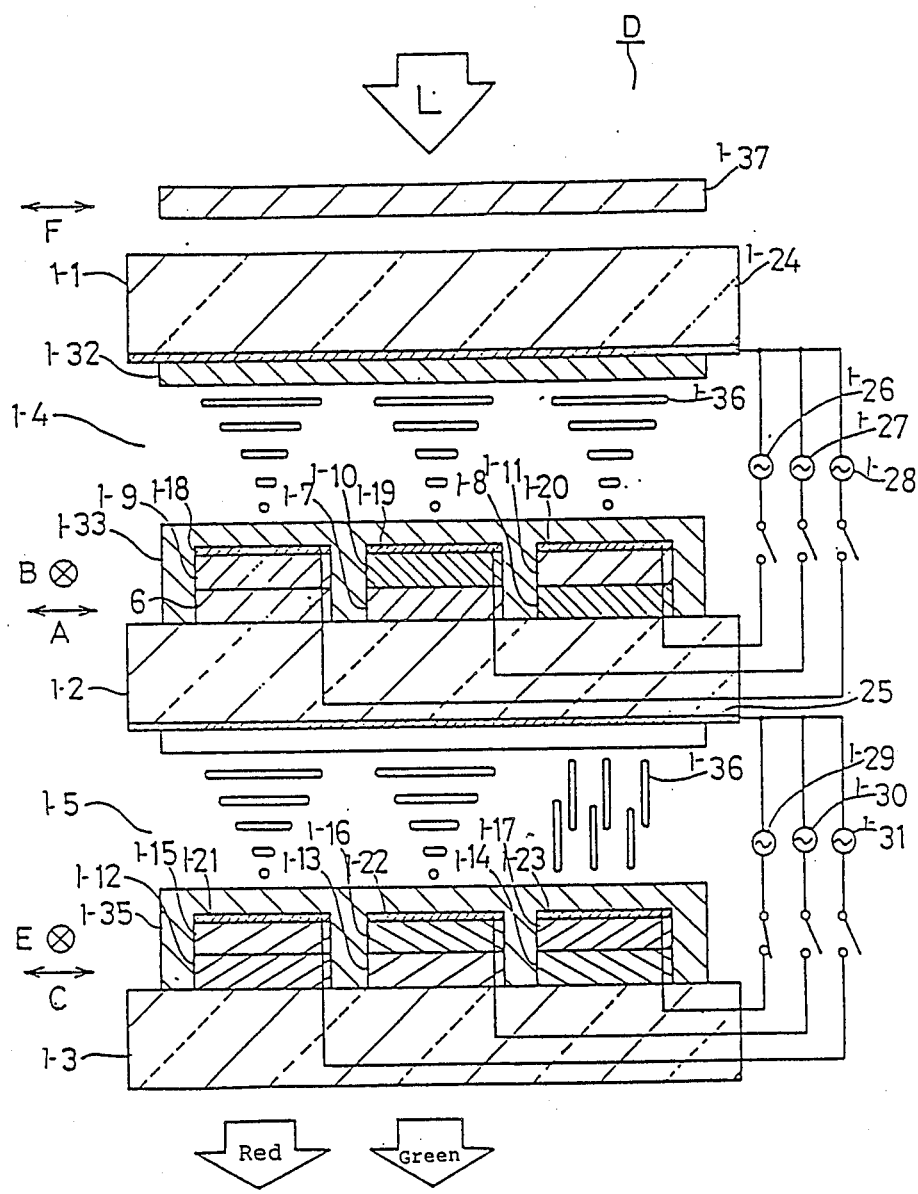

In the example of FIG. 3, a red display is observed on the left side, a green display in the middle and a black display on the right side. Voltage is applied between the transparent electrodes 1-23 and 1-25 and incident light (arrow L) is applied from above the neutral polarizer 1-37. On the left side, red light is observed under the glass substrate 1-3 as in FIG. 2. In the middle, the light is colored green in the color polarizer 1-10 since its direction of polarization is the same as the direction of the absorption axis of the color polarizer 1-10 and in the color polarizer 1-7, it transmits straight since its direction of polarization is different from the absorption axis direction of the color polarizer 1-7. The light advances to the cell 1-5. The direction of polarization of the light is twisted by 90° by the liquid crystal 1-36 of the cell 1-5. The direction of polarization obtained through twisting crosses the direction of the absorption axis of the color polarizer 1-16 at right angles and therefore the green light is transmitted through the color polarizer 1-16 straight without being absorbed and advances to the color polarizer 1-13. In the color polarizer 1-13, green light is transmitted straight since green is not a complementary color of cyan and green light is observed below the glass substrate 1-3. On the right side, a black display is observed as in FIG. 2. Here, by making the color polarizers 1-9, 1-10, and 1-11 very small, yellow can be observed below the glass substrate 1-3 by adding color stimuli.

Figure 4:
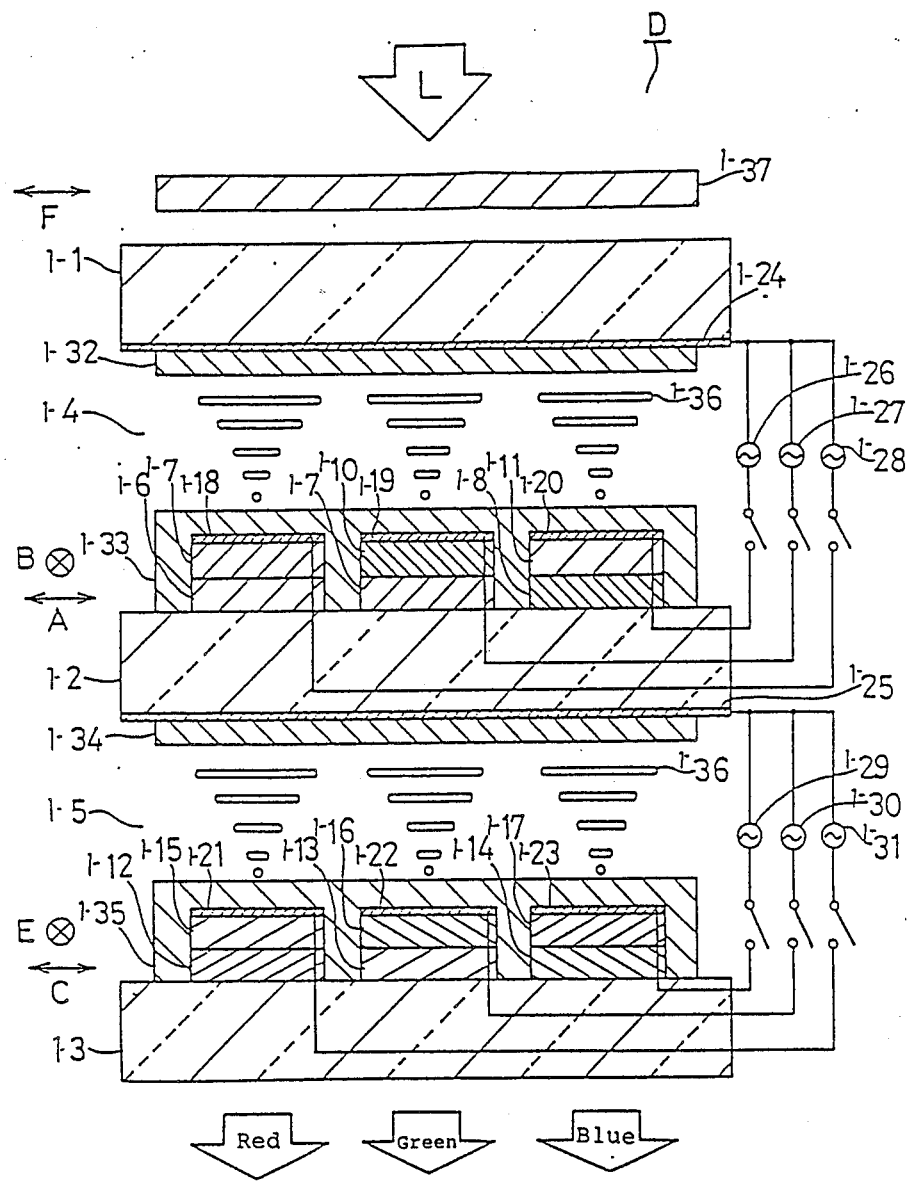

In FIG. 4, a red display is shown on the left side, a green display in the middle and a blue display on the right side. While no voltage is applied, incident light (arrow L) is applied from above the central polarizer 1-37. Red and green are observed respectively below the glass substrate 1-3 as in FIG. 3. On the right side, the light is colored blue in the color polarizer 1-11 since the light direction of polarization and the direction of the absorption axis of the color polarizer 1-11 are the same. The direction of the absorption axis of the color polarizer 1-8 and the direction of polarization of the blue light differ, and therefore the blue light is transmitted straight and advances to the cell 1-5, is twisted by 90° by the liquid crystal 1-36 and reaches the color polarizer 1-17. Since the polarization of blue color and color polarizer 1-17 differ from each other, the blue light is transmitted straight without being absorbed by the color polarizer 1-17 and blue light is seen below the glass substrate 1-3. Here by making the color polarizers 1-9, 1-10, and 1-11 very small, white can be seen below the glass substrate 1-3 by adding color stimuli.

Additionally, by applying or not applying voltage between the transparent electrodes 1-24 and 1-18, 1-19 and 1-20, and 1-25 and 1-21, 1-22, and 1-23, full color display is possible.

[Embodiment 2]

A second embodiment of the invention is described below according to the embodiment shown in the figures. However, this invention is not limited to those embodiments.

Figure 5:
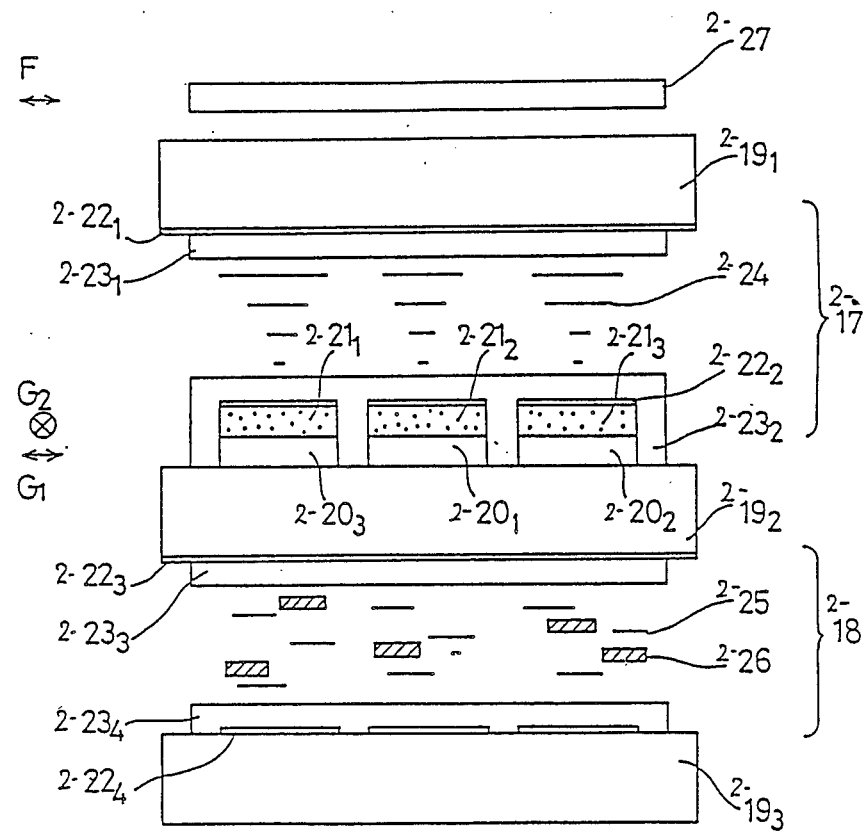
FIG. 5 is an explanatory drawing showing an embodiment of this invention.

FIG. 5 is an explanatory drawing showing the configuration of a second embodiment of this invention. In the first liquid crystal layer 2-17, red, green and blue polarizers 2-20$_1$, 2-20$_2$, and 2-20$_3$ are formed respectively so that the direction of the absorption axis is in parallel to the paper surface as shown by arrow G1 by attaching single-shaft drawn PVA (polyvinyl alcohol) film onto the glass substrate 2-19$_2$ and dying them with desired patterns using dichromatic dyes of red, green and blue. Then, the second layer red, green and blue color polarizers 2-21$_1$, 2-21$_2$, and 2-21$_3$ are formed respectively on the first layer blue, red, and green color polarizers 2-20$_3$, 2-20$_1$, and 2-20$_2$ so that the direction of the absorption axis is vertical to the paper surface as shown by the X mark G2, by attaching one-shaft drawn PVA film onto the first color polarizers 2-20$_1$, 2-20$_2$, and 2-20$_3$ and dying them with specified patterns using red, green and blue dichromatic dyes as in the first layer. Then, transparent electrodes 2-22$_2$ are formed by applying transparent conductive film on the entire surface and etching with the specified patterns.

After the transparent electrode 2-22$_2$ is formed, liquid crystal molecule orientation film 2-23$_2$ is formed. After the transparent electrode 2-22$_2$ is formed over the entire surface of the opposed substrate 2-19$_1$, the liquid crystal molecule orientation film 2-23$_1$ is formed.

On the other hand, formation of color polarizers is unnecessary for the second liquid crystal layer 2-18. After the transparent electrodes 2-22$_3$ and 2-22$_4$ are formed over the entire surface of the substrate 2-19$_2$, with the specified patterns of the substrate 2-19$_3$, the liquid crystal molecule orientation films 2-23$_3$ and 2-23$_4$ are formed. After attaching the substrates 2-19$_1$, 2-19$_2$, and 2-19$_3$ to each other and sealing them, the twisted nematic liquid crystal 2-24 is injected in to the first liquid crystal layer 2-17 and the guest host liquid crystal material is added with black dichromatic dye 2-26 dispersed therein to the second liquid crystal layer 2-18. When the glass substrates 2-19$_2$ and 2-19$_3$ of the first and second liquid crystal layers 2-17 and 2-18 are attached to each other, they should be aligned so that their display patterns match. A neutral polarizer 2-27 is provided on the incident light side on the outside of the two sets of liquid crystal cells 2-17 and 2-18. The arrow F in FIG. 5 shows that the direction of polarization of the neutral polarizer 2-27 is parallel to the paper surface.

In this case, the direction of polarization of the neutral polarizer 2-27 is parallel to the direction of the absorption axis of the color polarizers 2-20$_1$, 2-20$_2$, and 2-20$_3$.

1 mm thick glass is used for the substrate 2-19$_1$ and 2-19$_3$ and 0.3 mm glass for the substrate 2-19$_2$. A thickness in the range of 0.3 to 0.1 mm is more desirable for the substrate 2-19$_2$.

A thickness of 0.5 $\mu$m to 3 $\mu$m is desirable for the PVA film forming the color polarizers 2-20$_1$, 2-20$_2$, 2-20$_3$, 2-21$_1$, 2-21$_2$, and 2-21$_3$. For dichromatic dyes, LSR 405 for red, a mixture of LSB 278 and LSY 116 for green, and LSB 278 for blue (all manufactured by Mitsubishi Chemical Industries, Ltd.) are used.

The transparent electrodes 2-22$_1$, 2-22$_2$, 2-22$_3$ and 2-22$_4$ are In$_2$O$_3$ film formed by low temperature sputtering. A film thickness of 100 A to 300 A is desirable, and formed by ion plating.

In this example, the liquid crystal molecule orientation films 2-23$_1$, 2-23$_2$, 2-23$_3$, and 2-23$_4$ were formed using polyimide for a 600 A–700 A thicknes but they may be formed using polyether amide or polyether sulfone for a 600 A–700 A thickness.

The formed liquid crystal molecule orientation films 2-23$_1$, 2-23$_2$, 2-23$_3$, and 2-23$_4$ are subjected to a rubbing treatment in the corresponding directions of the liquid crystal molecule orientations.

ROTN-400 (manufactured by Roche) for the twisted nematic liquid crystal 2-24, ZL1-1565 for the guest host liquid 2-25, and LAMO 40 (Mitsubishi Chemical Industries), azo type Anthraquinone type mixture dye, for the dichromatic dye 2-26 were used respectively. Both of the liquid crystal layers were 7 $\mu$m thick. Generally the desired thickness is between 4 $\mu$m–9 $\mu$m.

For the neutral polarizer 2-27, 0.22 mm thick LC281-18 (Sanritsu Denki) was used.

The operating principle of this embodiment is described below referring to FIGS. 6 to 8. In these figures, the transparent electrodes and liquid crystal molecule orientation films are omitted for simplicity.

FIG. 6 shows a case of black display. The light 2-11, 2-12, and 2-13 passes through the neutral polarizer 2-27 and becomes linearly polarized. The light beams pass through straight or twisted by 90° depending on the orientation condition of the liquid crystal molecules 2-24 of the first liquid crystal layer 2-17. In the first liquid crystal layer 2-17 in FIG. 6, the liquid crystal molecules 2-24 of all the picture elements are vertically oriented and therefore the light 2-11, 2-12, and 2-13 is not absorbed in the second layer color polarizers 2-21$_1$, 2-21$_2$, and 2-21$_3$. It is absorbed in the first color polarizers 2-20$_1$, 2-20$_2$, and 2-20$_3$, colored blue, red and green by respective picture elements and enters the second liquid crystal layer 2-18. Since the direction of polarization of the incoming light and the major axis of the dichromatic dye 2-26 matches layer 2-18, the light 2-11, 2-12, and 2-13 are completely absorbed by the dichromatic dye and no light comes out.

Next, a case of single color red display is described (refer to FIG. 7). The light beams 2-11, 2-12, and 2-13 pass through the neutral polarizer 2-27 and become linearly polarized. Since the liquid crystal molecules of the left-side picture element are bent 90°, the direction of polarization of the light 2-11 is twisted by 90° when the light passes through the first liquid crystal layer 2-17 and is colored by the second red color polarizer 2-21$_1$. Then, since the dichromatic dye 2-26 is vertically oriented in the second liquid crystal layer 2-18, light is not absorbed in the second liquid crystal layer 2-18 and passes through it as red. In the middle picture elements, the liquid crystal molecule 2-24 is vertically oreinted and the direction of polarization of the light 2-12 is not twisted. The light passes through the first liquid crystal layer 2-17 and is colored by the red color polarizer 2-20$_1$ of the first layer. In the second liquid crystal layer 2-18, the dichromatic dye 2-26 is vertically oriented, the light 2-12 is not absorbed and passes through the second liquid crystal layer 2-18 as red linear polarization. The right picture element is the same as the middle picture element with respect to the first liquid crystal layer 2-17. The light 2-13 is colored by the green color polarizer 2-20$_2$ of the first layer but is absorbed by the dichromatic dye in the second liquid crystal layer 2-18 since the direction of polarization of the linear polarization matches the major axis of the dichromatic dye so that no light comes out. As a result, red display on a black base is possible.

Next, a case where red, green and blue are displayed by each picture element for a white display as a whole is described (refer to FIG. 8). The light 2-11, 2-12, and 2-13 passes through the neutral polarizer 2-27 and becomes linearly polarized. As the beams pass through the first liquid 2-17, their direction of polarization is twisted by 90°. They are colored by the second layer color polarizers 2-21$_1$, 2-21$_2$, and 2-21$_3$ and pass through the first liquid crystal layer 2-17 as red, green and blue colored light from the left picture element. After that, the beams pass through the second liquid crystal layer 2-18 straight as red, green and blue colored light without being absorbed in the second liquid crystal layer 18 since the dichromatic dye 2-26 is vertically oriented in the second liquid crystal layer 2-18.

Here, the arrow mark shows the path of the light and the black dot in the color polarizer indicates that the light is colored by this color polarizer when it passes through this point.

[Embodiment 3]

Figure 9:
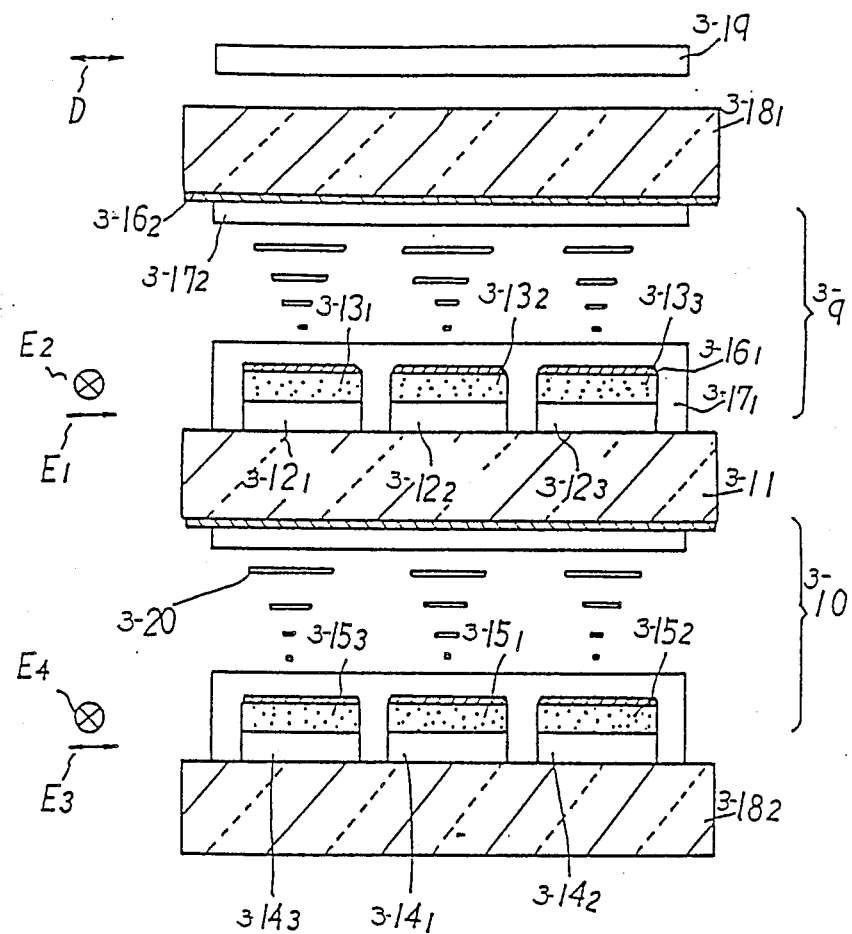
FIG. 9 is a sectional view showing the structure of a liquid crystal display cell of an embodiment according to this invention.

FIG. 9 is a sectional view showing the cell structure of the color liquid crystal display unit of a third embodiment of this invention. The liquid crystal cell has a two-layer structure and opposing clearances of the three glass substrates 3-18$_1$, 3-11, and 3-18$_2$ are filled with liquid crystal. The cyan, magenta and yellow color polarizers 3-12$_1$, 3-12$_2$, and 3-12$_3$ are formed by attaching one-shaft drawn polyvinyl alcohol (PVA) film onto the upper surface of the glass substrate 3-11 in the middle of the cell and dying them with the specified patterns using cyan, magenta, and yellow dichromatic dyes. On these first layer color polarizers 3-12$_1$, 3-12$_2$, and 3-12$_3$, one-shaft drawn PVA film is polymerized and attached. At this time, the PVA film should be attached so that its direction of drawing on the first and second layers cross at right angles. Next, the second layer color polarizers 3-13$_1$, 3-13$_2$, and 3-13$_3$ are formed by dying the second layer PVA film with the specified patterns using red, green and blue dichromatic dyes as in the first layer. Here, the second layer PVA film should be dyed so that the colors of the first layer color polarizers 3-12$_1$, 3-12$_2$, and 3-12$_3$ and the second layer color polarizers 3-13$_1$, 3-13$_2$, and 3-13$_3$ are complementary colors at the areas where they overlap.

Then, the first layer color polarizers 3-14$_1$, 3-14$_2$, and 3-14$_3$ are formed by attaching one-shaft drawn PVA films onto the lower grass substrate 3-18$_2$ and dyeing them with the specified patterns. It is necessary that the color arrangement of the color polarizers formed on the lower glass substrate 3-18$_2$ should be the same sequence as and deviated by one pitch from the color arrangement of the first and second layer color polarizers formed on the middle glass substrate 3-11. In this embodiment, colors of the first (and second) layer color polarizers are arranged as cyan (red), magenta (green) and yellow (blue) from the left on the lower gass substrate 3-18$_2$ and yellow (blue), cyan (red), and magenta (green) on the middle glass substrate 3-11. Therefore, on the lower glass substrate 3-18$_2$, cyan, magenta and yellow color polarizers 3-14$_1$, 3-14$_2$, and 3-14$_3$ are formed first, by dyeing the first layer PVA film with the specified patterns using cyan, magenta, and yellow dichromatic dyes. Then, one-shaft drawn PVA film is attached to this first layer color polarizer so as to cross the first layer at right angles, and then the second layer color polarizers 3-15$_1$, 3-15$_2$, and 3-15$_3$ are formed by dying the second layer PVA film into specified patterns as in the first layer using the red, green and blue dichromatic dyes. In$_2$O$_3$ or other transparent conductive film is formed on the obtained color polarizers 3-13 and 3-15 by low temperature sputtering or other methods and then transparent electrode 3-16$_1$ is formed by etching with the specified patterns. After the transparent electrode 3-16$_1$ is formed, liquid crystal molecule orientation film 3-17$_1$ is formed in the display region. Opposing the middle glass substrate 3-11, the upper glass substrate 3-18$_1$ is arranged and first and second layer liquid crystal layers are packed in the space between the glass substrates 3-18$_1$, 3-11, and 3-18$_2$ to form twist oriented liquid crystal cells 3-9 and 3-10. On the inside surface of the glass substrate opposing the color polarizer, the transparent electrode 3-16$_2$ and liquid crystal molecule orientation film 3-17$_2$ are formed and placed upon each other. The above glass substrates are attached to each other and sealed, twisted nematic liquid crystal material 3-20 is poured, and then the neutral polarizer 3-19 is provided. When the glass substrates are attached to each other, the first and second layer should be aligned so that their display picture elements match each other and the neutral polarizer 3-19 should be provided on the light incident side of the outside of the two liquid crystal cells. In the figure, arrow D is the direction of polarization of the neutral polarizer 3-19. E1, E2, E3 and E4 are directions of the absorption axis of the color polarizers 3-12, 3-13, 3-14, and 3-15. The direction of polarization of the neutral polarizer 3-19 either crosses at right angles, or is parallel to the directions of absorption axes of the color polarizers respectively.

Figure 10:
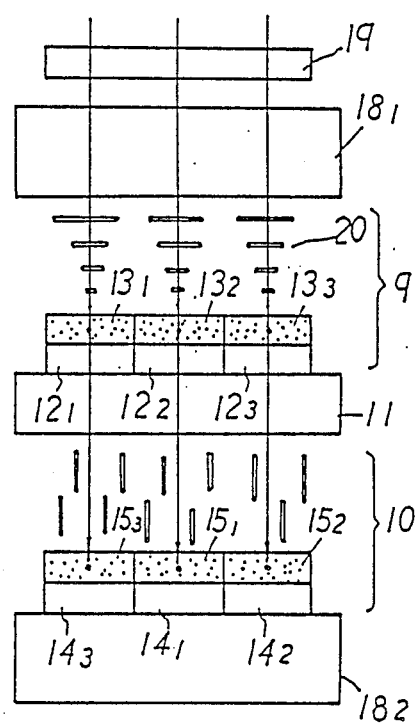
FIGS. 10 through 12 are explanatory drawings of the operation of the liquid crystal display cell shown in FIG. 9.

Operation principle of this embodiment will now be described. FIG. 10 is an explanatory drawing of the operation showing a case of black display. The linearly polarized light after passing through the neutral polarizer 3-19 is twisted by 90° according to the arrangement of the liquid crystal molecules of the first liquid crystal cell 3-9. It is colored red, green, or blue respectively by the second layer color polarizers 3-13$_1$, 3-13$_2$, and 3-13$_3$ but in the cyan, magenta and yellow color polarizers 3-12$_1$, 3-12$_2$, and 3-12$_3$ immediately below it, it is not affected because of the different direction of the absorption axis and direction of polarization and passes through the first liquid crystal cell 3-9 as red, green and blue color light. In the second liquid crystal cell 3-10, the liquid crystal molecules are oriented vertically and therefore, the light reaches the second layer color polarizers 3-15$_1$, 3-15$_2$, and 3-15$_3$ formed on the glass substrate 3-18 a, without turning in the direction of polarization. Here, since the direction of polarization and direction of the absorption axis of the color polarizer match, red, green, and blue color light is absorbed by the color polarizers 3-15$_1$, and 3-15$_3$, and thus, all the picture elements are observed as black.

A case of displaying red by all picture elements will be described referring to FIG. 11. In the picture element on the left side in FIG. 11, the liquid crystal molecule has been twisted by the first liquid crystal layer 9 and therefore, the light is colored red by the second layer color polarizer 3-13$_1$, enters the second liquid crystal layer 3-10 as it is, and the direction of polarization is twisted by 90°. In the first layer color polarizer 3-14$_3$, colors other than yellow (red, green) are absorbed and the red color passes through it as it is. In the middle picture element, since the liquid crystal molecule is vertically arranged, the light is colored magenta by the first layer color polarizer $3\text{-}12_2$, enters the second liquid crystal layer 10 as it is, and the direction of polarization is twisted by 90°. In the second layer color polarizer $3\text{-}15_1$, light other than red is cut off and only the red light passes through. In the right side picture element, the liquid crystal molecule is oriented vertically and therefore, the light is colored yellow in the first layer color polarizer $3\text{-}12_3$, and enters the second liquid crystal layer $3\text{-}10$ as it is. Here the direction of polarization is unchanged, colors other than magenta (red, blue) are absorbed in the first layer color polarizer $3\text{-}14_2$, and only the red light passes through.

As described above, by changing the arrangement of the liquid crystal molecules and selecting either one of the color polarizers laid upon each other, red display is possible for all the picture elements.

Next, display of each color red, green and blue of the three picture elements will be described referring to FIG. 12. The liquid crystal molecule is twisted by 90° in the first liquid crystal layer $3\text{-}9$ and therefore the incident light is colored red, green and blue respectively by the second layer color polarizers $3\text{-}13_1$, $3\text{-}13_2$, and $3\text{-}13_3$ and enters the liquid crystal layer $3\text{-}10$ as it is. Here, since the liquid crystal molecule is twisted by 90°, the direction of polarization of the light passing through is twisted by 90°. In the second layer color polarizers $3\text{-}15_1$, $3\text{-}15_2$, and $3\text{-}15_3$, since the direction of absorption axis and the direction of polarization of the linear polarization are at right angles, the light passes straight through unabsorbed. The first layer color polarizers $3\text{-}14_1$, $3\text{-}14_2$, and $3\text{-}14_3$ allow yellow (red, green), cyan (green, blue), and magenta (blue, red) and therefore, red, green, and blue color lights after passing through the second layer color polarizers pass straight through the first layer color polarizers. When these picture elements are sufficiently small, they are seen by adding color stimuli.

Figure 11:
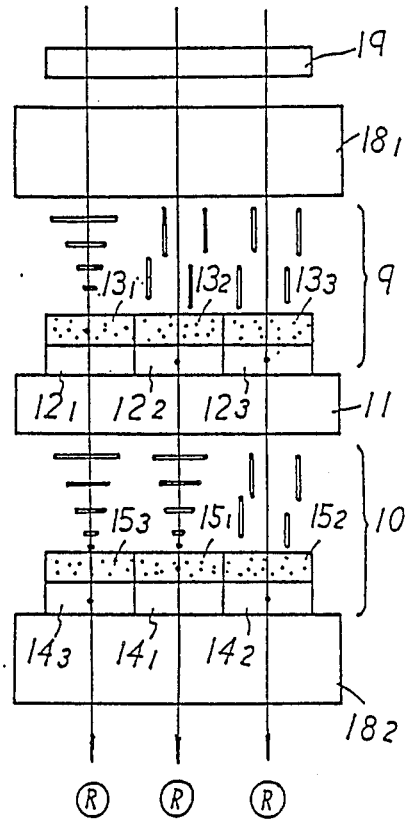
Figure 12:
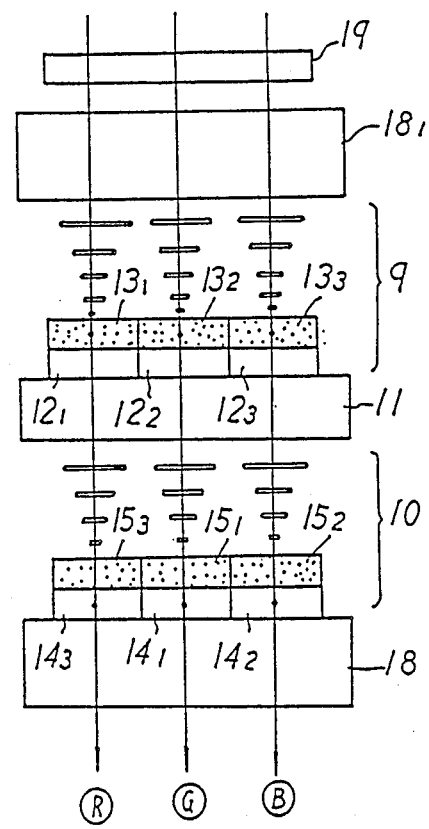

In FIGS. 10 to 12, the arrow shows the path of the light. The light is colored by the color polarizers shown by a black dot. (R), (G), and (B) show red, green and blue lights respectively.

[Embodiment 4]

A fourth embodiment according to this invention is described in detail below.

Figure 13:
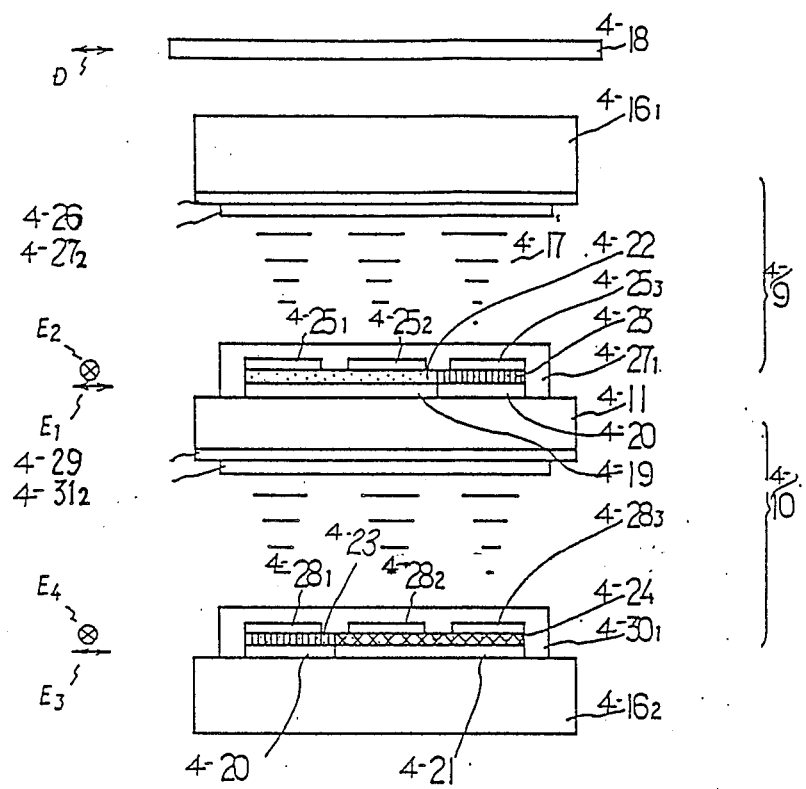
FIG. 13 is a sectional view showing the cell structure of the embodiment according to this invention.

FIG. 13 is a sectional view showing the cell structure of a fourth embodiment according to this invention. The red and green color polarizers 4-19 and 4-20 are formed by attaching one-shaft drawn polyvinyl alcohol (PVA) onto the one glass substrate 4-11 composing the first liquid crystal layer 4-9 of the liquid crystal cell, and dyeing them with the specified patterns using red and green dichromatic dyes. In this embodiment, two picture elements of the three composing one group are colored by the red color polarizer 4-19 and the remaining one picture element is the green color polarizer 4-20.

One-shaft drawn PVA film is attached to the first layer color polarizer. At this time, the film should be attached so that the directions of drawing of the first and second layers cross each other at right angles. Then, the second layer color polarizers 4-22 and 4-23 are formed by dyeing the second layer PVA film with the specified pattern as in the first layer using cyan and magenta dichromatic dyes. At this time, the second layer PVA film should be dyed so that the colors of the first and second polarizers are complementary.

Then, one-shaft drawn PVA film is attached to the other glass substrate $4\text{-}16_2$ of the second liquid crystal layer 4-10 and dyed with the specified pattern. First, the first layer PVA film is dyed with the specified pattern using green and blue dischromatic dyes to form green and blue color polarizers 4-20 and 4-21. Here, the blue color polarizer 4-21 is made one picture element and the two picture elements are formed to correspond with the red and green picture elements in the above described first liquid crystal layer 4-9. On that first layer color polarizer, one-shaft drawn PVA film is attached. The second layer PVA film is dyed to a specified pattern as in the first layer using the magenta and yellow dichromatic dyes to form the second layer color polarizers 4-23 and 4-24.

After a transparent conductive film is formed on each color polarizer of the first and second liquid crystal layer by low temperature sputtering or other methods, transparent electrodes $4\text{-}25_1$, $4\text{-}25_2$, $4\text{-}25_3$, $4\text{-}28_1$, $4\text{-}28_2$, and $4\text{-}28_3$ are formed by etching with specified patterns. Then after a transparent electrode is formed, liquid crystal molecule orientation films $4\text{-}27_1$ and $4\text{-}30_1$ are formed respectively. Another substrate opposing the color polarizer in the first and second liquid crystal cells 4-9 and 4-10 is the transparent electrode 4-26 and 4-29 and liquid crystal molecule orientation film $4\text{-}27_2$ and $4\text{-}31_2$ formed on the glass substrate.

After the above substrates are attached to each other and sealed, twisted nematic liquid crystal is poured. When the first and second liquid crystal layer glass substrates 4-11, $4\text{-}16_1$, and $4\text{-}16_2$ are attached to each other, they should be aligned so that their display picture elements match and a neutral polarizer 4-18 is provided on the outside of the liquid crystal cells on the incident light side. D in the figure is the direction of polarization of the neutral polarizer and E1 and E2 are directions of the first and second layer color polarizer absorption axes of the first liquid crystal cell 4-9, and E3 and E4 are direction of the absorption axis of the first and second layer color polarizers of the second liquid crystal cell 4-10. The direction of polarization of the neutral polarizer 4-18 crosses the direction of the absorption axis of each color polarizer at right angles or in parallel. The operation principle of this embodiment is described below. FIG. 14 shows a case of black display. The linearly polarized light after passing through the neutral polarizer 4-18 is colored red and green in the first layer color polarizers 4-19 and 4-20 without altering the direction of polarization since the liquid molecules of the first liquid crystal layer 4-9 are oriented vertically. In the second liquid crystal layer 4-10 also, the liquid crystal molecules are oriented vertically and the light is absorbed by the first green and blue color polarizers 4-20 and 4-21. Therefore, all the picture elements are observed as black.

A case to display red by all the picture elements will be described next. As for the left side picture element in FIG. 15, since the liquid crystal molecules of the first liquid crystal layer 4-9 are oriented vertically, the light is colored red by the first layer color polarizer 4-19 because the liquid crystal molecule oriented vertically and the red light enters the second liquid crystal layer 4-10 as it is. The liquid crystal molecule is twisted 90° there, the direction of polarization is thus also twisted 90° and the light is absorbed by the color polarizer 4-23 of the second layer 4-10. However, the red light passes through as it is. For the central picture element, since the liquid crystal molecule of the first liquid crystal layer 4-9 is oriented vertically, the light is colored red by the first layer collor polarizer 4-19, enters the second liquid crystal 4-10 straight, and the direction of polarization is twisted by 90° according to the liquid crystal molecule twisted 90°. The light is absorbed by the second layer yellow color polarizer 4-24 but the red light passes through as it is. For the right side picture element, the liquid crystal molecule is twisted by 90° by the first liquid crystal layer 4-9, and the direction of polarization is also twisted 90°.

The light is absorbed by the second layer magenta color polarizer 4-23 and enters the second liquid crystal layer 4-10. The liquid crystal molecule of the second liquid crystal layer is oriented vertically and therefore, the light is absorbed by the second layer yellow color polarizer 4-24 and only the red light passes through. As described above, by changing the orientation of the liquid crystal molecule and selecting either one of the color polarizers laid upon each other, red display is possible for all the picture elements. It is the same for green and blue single color display.

Next, display of red, green or blue of the three picture elements is described. As shown in FIG. 16, with respect to the left side picture element, the light is colored red by the first liquid crystal layer 4-9. Elements other than green are transmitted through the magenta color polarizer of the second liquid crystal layer 4-10 and thus the red light passes through it. For the central picture element, the light is colored cyan in the first liquid crystal layer. In the second liquid crystal layer, the light is absorbed by the yellow color polarizer 4-24 and only the green light passes through. For the right side picture element, the light is colored magenta by the second layer color polarizer 4-23 of the first liquid crystal layer and only blue light passes through the first layer color polarizer 4-21 of the second liquid crystal layer. By making those picture elements sufficiently small, they are seen as a whole by adding color stimuli. The arrow marks in FIGS. 14 to FIG. 16 shows the path of the light. The light is colored various colors by the color polarizers shown by black dots. [Embodiment 5]

The embodiment will be described in detail below according to this invention.

FIG. 17 is a sectional view showing the cell structure of a fifth embodiment of the present invention. The first color polarizer 5-19 is formed by attaching single-shaft drawn polyvinyl alcohol (PVA) film onto one of the glass substrate 5-11 of the liquid crystal cell and dying the entire surface of the PVA film using cyan dichromatic dye. Single-shaft drawn PVA film is attached to the first layer color polarizer 5-19. In this case, the films should be attached so that the directions of drawing of the first and second layers crosss each other at right angles. Then the entire surface of the PVA film is dyed using red dichromatic dye to form the second layer color polarizer 5-20.

Next, single-shaft drawn PVA film is attached to the other glass substrate $5-16_2$ and dyes the PVA film using magenta dichromatic dye to form the first layer color polarizer 5-22. Moreover, single-shaft drawn PVA film is attached to the first layer color polarizer 5-22, the PVA film is dyed using green dichromatic dye to form the second layer color polarizer 5-23. Transparent conductive film is formed on those color polarizers 5-20 and 5-23 by low temperature sputtering or other methods and then transparent electrodes $5-21_1$ and $5-24_1$ are formed by etching with specified patterns. After the transparent electrode is formed, liquid crystal molecule orientation films $5-25_1$ are formed on the transparent electrodes $5-21_1$ and $5-24_1$ in the first and second liquid crystal cells 5-9 and 5-10, another substrate opposing the color polarizer contains the transparent electrodes $5-21_2$ and $5-24_2$ and liquid crystal molecule orientation film $5-25_2$ formed on the glass substrates $5-16_1$ and 5-11. After the above substrates are attached to each other and sealed, nematic liquid crystal 5-17 is poured. When the first and second liquid crystal cells 5-9 and 5-10 are sealed together, they are aligned so that their display picture elements agree and one neutral polarizer 5-18 is provided on the incident light side of the two layers of liquid crystal cells. In the figure, D indicates the direction of polarization of the neutral polarizer. E1, E2, E3, and E4 are the directions of the absorption axes of the neutral polarizers 5-19, 5-20, 5-22, 5-23 respectively. The directions of polarization of the neutral polarizers cross the directions of absorption axes of the color polarizers at right angles or are parallel respectively. The operation principle of this embodiment is described below. FIG. 18 shows a case of black display. In this case, voltage is not applied to the first layer liquid crystal layer 5-9 but only to the second liquid crystal layer 5-10. The linear polarization after passing through the neutral polarizer is twisted 90° in the direction of polarization according to the arrangement of the liquid crystal molecules of the first liquid crystal cell 5-9. It is colored red by the second layer color polarizer 5-20. Since the direction of polarization and direction of absorption axis of the color polarizer cross each other at right angles in the first layer color polarizer 5-19 provided just below it, the light passes through the first liquid crystal cell 5-9 as red color light. In the second liquid crystal cell 5-10, the liquid crystal molecules are oriented vertically by the applied voltage and the light reaches the second layer color polarizer 5-23 with no rotation of the direction of polarization. Here, since the direction of polarization and the direction of the absorption axis of the color polarizer coincide, the red color light is absorbed in the second layer color polarizer 5-22 and therefore, all the picture elements are observed as black.

Next, a case to display red with all the picture elements is described referring to FIG. 19. In this case, no voltage is applied to any of the first and second liquid crystal layers 5-9 or 5-10. Since the liquid crystal molecule has been twisted 90° by the first liquid crystal layer 5-9, the light is colored red by the second layer color polarizer 5-20, enters the second liquid crystal layer 5-10 as it is and the direction of polarization is twisted by 90°. Colors other than magenta (red, blue) are absorbed in the second color polarizer 5-22 and the red light passes through as it is. Next, case of display of red, green, or blue of the three picture elements is described. For the left picture element in FIG. 20, since voltage is applied to neither the first nor the second liquid crystal layers, the liquid crystal molecule is twisted by 90° in the first liquid crystal layer 5-9, the light is colored red in the second layer color polarizer 5-19 and enters the second liquid crystal layer 5-10 as it is, and direction of polarization is twisted 90°. In the first layer color polarizer 5-22, colors other than magenta (red, blue) are absorbed but the red light passes through as it is. then, in the central picture element, voltage is applied to the liquid crystal layer of the first layer only. In this case, since the liquid crystal molecule of the first liquid crystal layer 5-9 is oriented vertically, the light is colored by the first layer cyan color polarizer 5-19. The light enters the second liquid crystal layer 5-10, the direction of polarization is twisted by 90°, and only the green light passes through the second layer green color polarizer 5-23. Next, for the right side picture element, voltage is applied to both the first and second layer liquid crystal layers. Since the liquid crystal molecule is oriented vertically in the first liquid crystal layer 5-9, the light is colored by the first layer cyan (green, blue) color polarizer 5-19. The light enters the second liquid crystal layer 5-10 and reaches the color polarizer without the direction of polarization being turned, the green light is absorbed by the color polarizer 5-22 of the first layer magenta (red, blue) and only the blue light passes through. When these picture elements are sufficiently small and the rate of the color elements proper, they are seen as white by adding color stimuli.

In FIGS. 18 through 20, the arrow indicates the path of the light and the light is colored various colors by the color polarizers shown by black dots.

While only certain embodiments of the present invention have been described, it will be apparent to those skilled in the art that various changes and modifications may be made therein without departing from the spirit and scope of the present invention as claimed.

What is claimed is:

1. A color liquid crystal display device, comprising:
   a first liquid crystal display cell having a liquid crystal material disposed between first and second substrates;
   first and second color polarizers disposed over said second substrate, said first and second color polarizers each containing at least one color which is the complement of the color contained by the other color polarizer, and having polarization axes oriented at right angles to each other;
   a second liquid crystal display cell having a liquid crystal material disposed between said second substrate and a third substrate and having picture elements aligned with said first display cell;
   third and fourth color polarizers disposed over said third substrate, said third and fourth color polarizers each containing at least one color which is the complement of the color contained by the other color polarizer and which is different from the colors contained by said first and second color polarizers of corresponding picture elements, and having polarization axes oriented at right angles to each other; and
   a neutral polarizer having a polarization axis parallel to a predetermined polarization axis of one of said first and second, and said third and fourth color polarizers, disposed on an incident light side of said first substrate.

2. The color liquid crystal display device of claim 1, wherein said first through fourth color polarizers each comprises two colors.

3. The color liquid crystal display device of claim 1, wherein said first through fourth color polarizers each comprises three colors.

4. The color liquid crystal display device of claim 1, wherein said first through fourth color polarizers each comprises one color.

5. A color liquid crystal display device, comprising:
   a first liquid crystal display cell having a liquid crystal material diposed between first and second substrates;
   a second liquid crystal display cell having a liquid crystal material disposed between said second substrate and a third substrate;
   picture elements of said first and second display cells being aligned;
   a pair of color polarizers disposed on each of said second and third substrates, each pair of color polarizers having polarization axes oriented at right angles to each other,
   each of said pair of color polarizers disposed on said second substrate containing at least one color which is complementary to a color contained by a corresponding color polarizer disposed on said third substrate; and
   a neutral polarizer having a polarization axis parallel to a predetermined one of said pairs of color polarizers disposed on an incident light side of said first substrate.

6. The color liquid crystal display device of claim 5, wherein the pair of color polarizers disposed on said second substrate comprise the colors red, green and blue, and the pair of color polarizers disposed on said third substrate comprise the colors cyan, magenta and yellow.

* * * * *